United States Patent
Suzuki et al.

(10) Patent No.: US 6,654,822 B1
(45) Date of Patent: Nov. 25, 2003

(54) CASCADABLE CROSS CONNECT ARCHITECTURE

(75) Inventors: Shiro Suzuki, Folsom, CA (US); Bill Check, Elk Grove, CA (US); Vicky Duerk, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 09/606,785

(22) Filed: Jun. 28, 2000

(51) Int. Cl.[7] .............................................. G06F 13/14
(52) U.S. Cl. ........................ 710/51; 370/509; 370/216; 379/201
(58) Field of Search ............................. 710/51; 370/509, 370/216, 229, 401, 412, 399; 379/201

(56) References Cited

U.S. PATENT DOCUMENTS

| | | | | |
|---|---|---|---|---|
| 4,685,101 A | * | 8/1987 | Segal et al. ................... | 370/89 |
| 4,697,262 A | * | 9/1987 | Segal et al. ................... | 370/84 |
| 5,970,130 A | * | 10/1999 | Katko ......................... | 379/201 |
| 6,009,106 A | * | 12/1999 | Rustad et al. ................ | 370/523 |
| 6,285,687 B1 | * | 9/2001 | Lovelace et al. ............. | 370/509 |
| 6,385,165 B1 | * | 5/2002 | Kumata ....................... | 370/216 |

* cited by examiner

Primary Examiner—Abdelmoniem Elamin
(74) Attorney, Agent, or Firm—Fish & Richardson P.C.

(57) ABSTRACT

A cross connect with a cascadable architecture may selectively output a switched or an unswitched data stream from a transmission line. Two or more such cross connects may be cascaded by connecting their system side ports for bi-directional communication. Either of the cross connect connected directly to the transmission line or the cross connect connected indirectly to the transmission line through the other cross connect may switch the data stream from the transmission line for output to a system.

15 Claims, 4 Drawing Sheets

CASCADABLE CROSS CONNECT ARCHITECTURE

BACKGROUND

A T1 transmission line, also referred to as a DS1 line, is a dedicated telephone connection that may support data ranges of up to 1.544 Mbits per second (Mbps). A T1 line may have 24 individual channels, each of which support 64 Kbps. Each 64 Kbps channel may be configured to carry digital data that may represent voice or other types of analog data, or purely digital information.

E1 is the European format for digital transmission and is similar to the North American T1. E1 carries signals at 2.048 Mbps (32 channels at 64 Kbps). E1 and T1 lines may be interconnected for international use.

T1/E1 transceivers may receive and transmit digital signals over a telephone communication transmission line to a connecting communication system, for example, a business computer network. T1 (and E1) lines may be used as a leased line option for businesses connecting to the Internet and for Internet Service Providers (ISPs) connecting to the Internet backbone.

Data transmitted over a T1 line may be formatted in frames including a predetermined number of bits, e.g., 193 bits for a standard T1 frame 100, as shown in FIG. 1. The frame includes twenty-four 8-bit time slots 102, each corresponding to one of the twenty-four channels in the T1 line.

The information in the time slots may be switched by a cross connect over dedicated circuitry according to a switching table. Switching information over a cross connect may entail a certain switching delay. It may be desirable to connect two or more cross connects to switch signals between multiple transmission lines. However, connecting cross connects serially may increase the switching delay since the overall switching delay is cumulative, with each cross connect contributing. Also, each cross connect may be limited to a number of input ports. This may limit the cross connect's access to information from transmission lines not directly input to that cross connect.

DESCRIPTION OF DRAWINGS

Like reference symbols in the various drawings indicate like elements.

DETAILED DESCRIPTION

Figure 2:
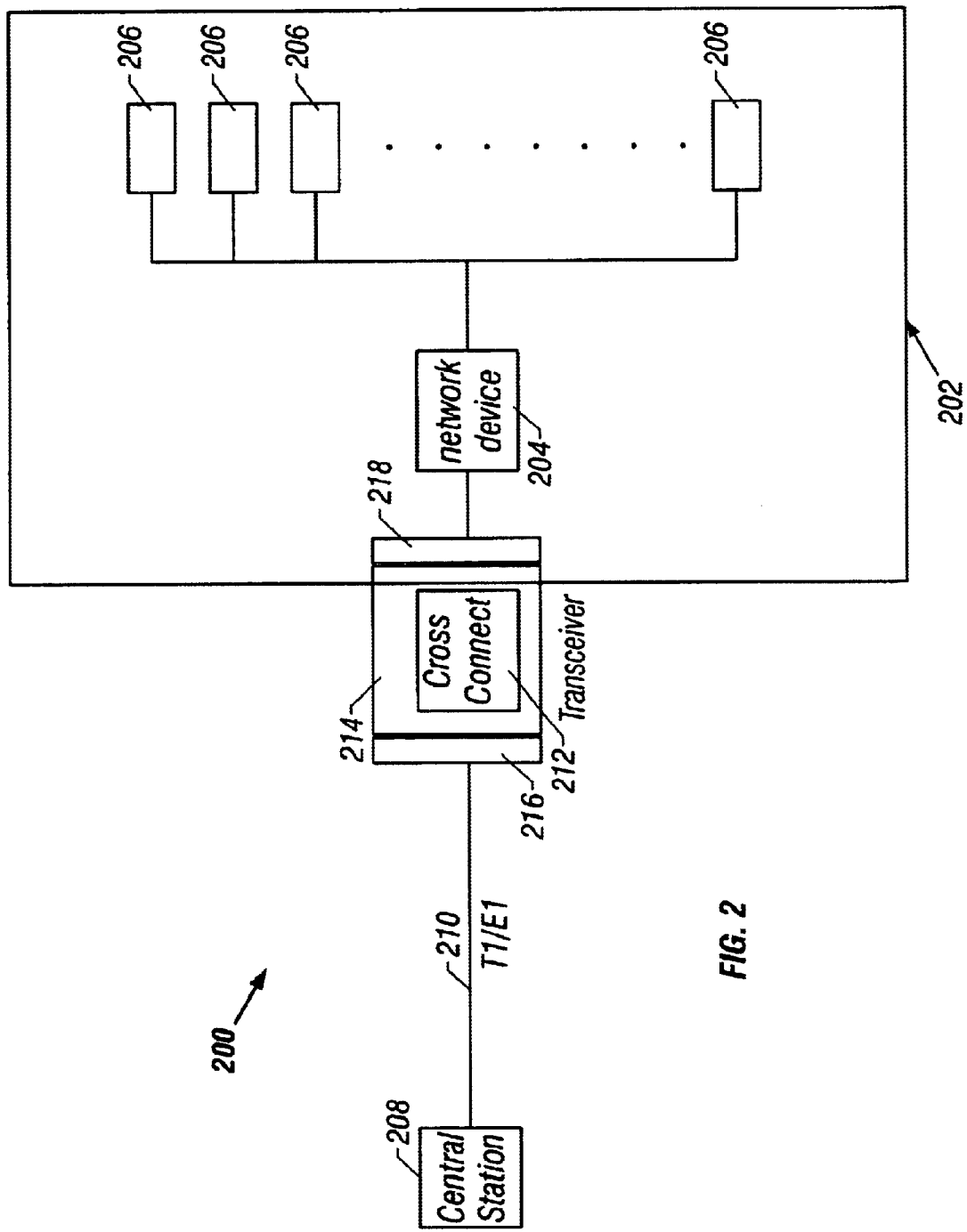
FIG. 2 is a schematic diagram of a system for switching signals in a networked communication system according to an embodiment.

FIG. 2 illustrates a system 200 for switching signals from a T1 carrier according to an embodiment. An end system 202, for example, a business network, communicates with a central station 208 over a T1 transmission line 210. The business network may include a networking device 204 or a number of networked devices 206, e.g., telephones and/or computers. The central station may be a telephone company that owns the T1 lines or an Internet service provider (ISP) that leases the T1 lines and provides connection to the Internet for the end system. Frames of digital data communicated between the central station 208 and the system 202 may be switched across a cross connect 212 in a transceiver 214 at the end system. The cross connect 212 may switch the digital data in the frames between the ports on the line side bus 216 and the ports on the system side bus 218 system side bus according to a switching table, e.g., a time slot interchange (TSI) map.

Figure 1:
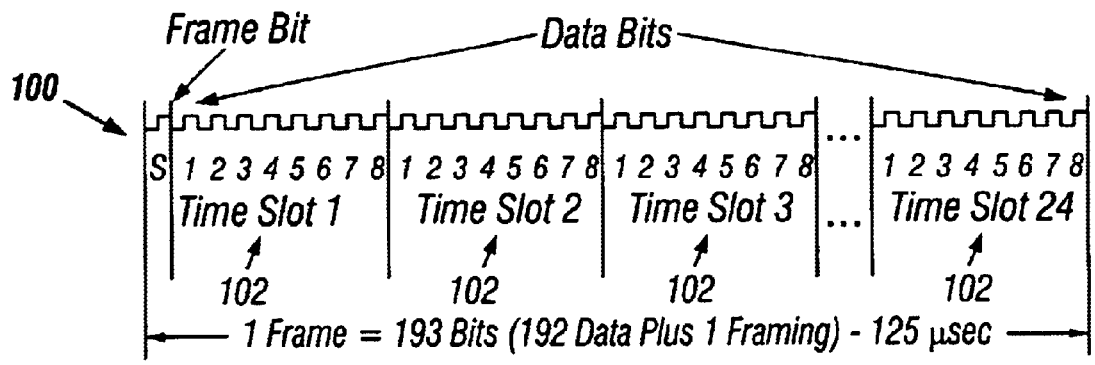
FIG. 1 is a schematic representation of a T1 frame format.

The digital signals representing the voice/data information transmitted over the transmission line 210 are formatted into frames according to a particular format (see FIG. 1). The frames 100 may be organized and transmitted according to a time division multiplex (TDM) scheme. TDM is a type of data multiplexing that combines data streams by assigning each stream a different time slot in a set. TDM repeatedly transmits a fixed sequence of time slots 102 over a single transmission channel. Within T-Carrier systems, such as T1 and T3, TDM combines Pulse Code Modulated (PCM) streams created for each conversation or data stream. PCM is a sampling technique for digitizing analog signals. PCM samples the signal 8000 times a second, each sample represented by 8 bits for a total of 64 Kbps.

The frame 100 may include 193 bits, corresponding to twenty four 8-bit time slots 102. Each time slot 102 may correspond to one of the twenty four channels in the T1 line. The frames may include payload information as well as frame formatting information and signaling information. Signaling information may represent phone receiver status (e.g., on-hook or off-hook), battery power level, and other service type information.

Several different types of framing formats may be used in telephone communication systems. These formats may use various formatting schemes and signaling structures. These include, for example, Superframe (SF) and Extended Superframe (ESF). Also, different carriers may be used to transmit frames including payload and signaling information. These include, for example, T1C, T2, T3 and E1 carriers. These various framing formats and carriers may be encompassed by the various embodiments.

Figure 3:
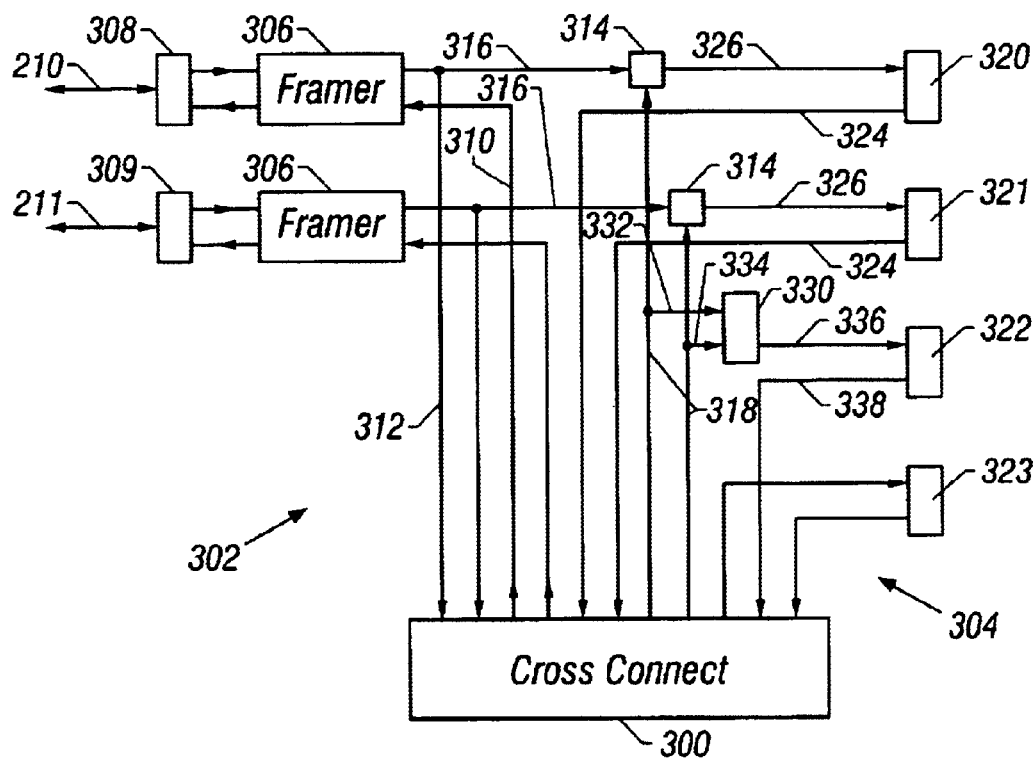
FIG. 3 is a schematic diagram of a cross connect with a cascadable architecture according to an embodiment.

FIG. 3 illustrates a cross connect 300 with a cascadable architecture according to an embodiment. The cross connect has a line side 302 and a system side 304. Two framers 306 are connected to the line side of the cross connect. Each framer receives digital signals in frames from one of the transmission lines 210, 211. The framer 306 recognizes the frame pattern presented in the signals and formats the information in the frame into time slots for switching through the cross connect 300 according to the TSI map. The framer may also format switched information in time slots transmitted from the system side into frames for transmission over the associated transmission line 210 or 211.

The cross connect 300 may have two line side ports 308, 309, one for each framer 306. Each framer may transmit a transmit (TX) data stream from the cross connect and receive a receive (RX) data stream from the associated transmission line.

The framer receives switched information from the cross connect in the TX stream on data line 310. The unswitched RX stream from the line side port may be input to the cross connect for switching on data line 312. The unswitched RX stream may also be input to a multiplexer (MUX) 314 on data line 316. A switched RX stream from the cross connect 300 may also be input to the MUX 314 on data line 318.

The cross connect may have four system side ports 320, 321, 322, and 323. Port 320 corresponds to transmission line 210, and port 321 corresponds to transmission line 211. Each port 320, 321 includes a data line 324 for transmitting a TX stream from the system side to the cross connect. For each of system side ports 320 and 321, the MUX 314 may be controlled by the cross connect or other system control device to output either the unswitched RX stream or switched RX stream to the associated system side port over an associated data line 326.

Port 322 may be used to transmit TX and RX streams between the system 200 and the cross connect 300. A data line 328 transmits the unswitched TX stream to the cross connect. A MUX 330 receives two switched RX streams, each corresponding to one of the transmission lines 210, 211, from the cross connect over data lines 332 and 334, respectively. MUX 330 may be controlled to transmit multiplexed signals from these data lines to port 322 over data line 336. Port 323 may also be used to transmit TX and RX streams directly between the system 200 and the cross connect 300.

Figure 4:
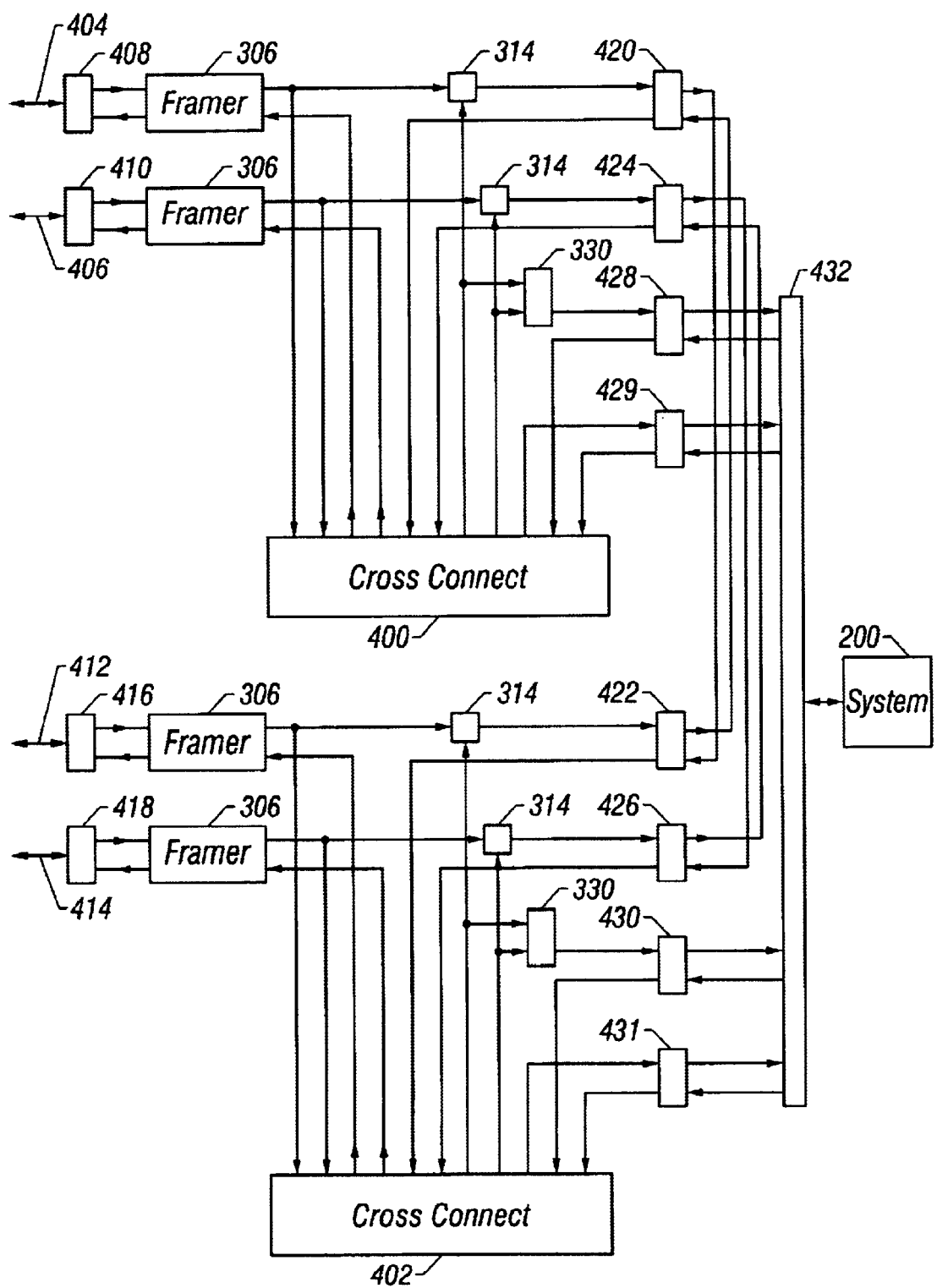
FIG. 4 is a schematic diagram of two cascaded cross connects according to an embodiment.

FIG. 4 illustrates two cascaded cross connects 400 and 402. Transmission lines 404 and 406 may be connected to line side ports 408, 410 of cross connect 400. Transmission lines 412 and 414 may be connected to line side ports 416, 418 of cross connect 402. The first system side port 420, 422 of each cross connect may be connected for bi-directional communication, and the second system side port 424, 426 of each cross connect are connected for bi-directional communication. Each cross connect 400 and 402 has access to unswitched RX streams from each of transmission lines 404, 406, 412, and 414. Accordingly, each cross connect may be used to switch information from any of these RX streams at any given time for output to the system 200. The third system side port 428, 430 and fourth system side ports 429, 431 of each cross connect may be used to communicate the switched RX streams from the cross connects 400, 402. Each port 428, 430 may be connected to a multiplexer 432 for multiplexed input/output (I/O) with the system 200.

Cross connects connected according to the embodiment shown in FIG. 4 may avoid blocking situations due to traffic overloads. A blocking situation may occur when a cross connect exceeds its switching capacity. For example, transmission line 402 may have twenty four channels, each of which may be designated for use on a different networked device on the system 200. Cross connect 400 may have a capacity to only switch information on ten channels simultaneously. Information received on more than ten channels simultaneously may cause a blocking situation in the cross connect 400. The blocking situation may cause delays for some network users or system errors. According to the embodiment shown in FIG. 4, if say, fifteen channels on transmission line were active, i.e., required switching, ten channels may be presented to cross connect 400 and the other five channels may be passed to cross connect 402 for switching, thereby avoiding exceeding the switching capacity of cross connect 400, and hence avoiding a blocking situation. Although the described example presented ten channels to cross connect 400, i.e., its capacity, it may be desirable to present each cross connect with a number of channels below its switching capacity threshold if possible.

Cross connects connected according to the embodiment of FIG. 4 may avoid cumulative switching delay. For example, information in a time slot received on transmission line 404 may be passed through MUX 314 as an unswitched RX data stream and input to cross connect 402 for switching at system side port 422. Thus, the RX stream is not subject to switching delay at cross connect 400, only at cross connect 402.

Figure 5:
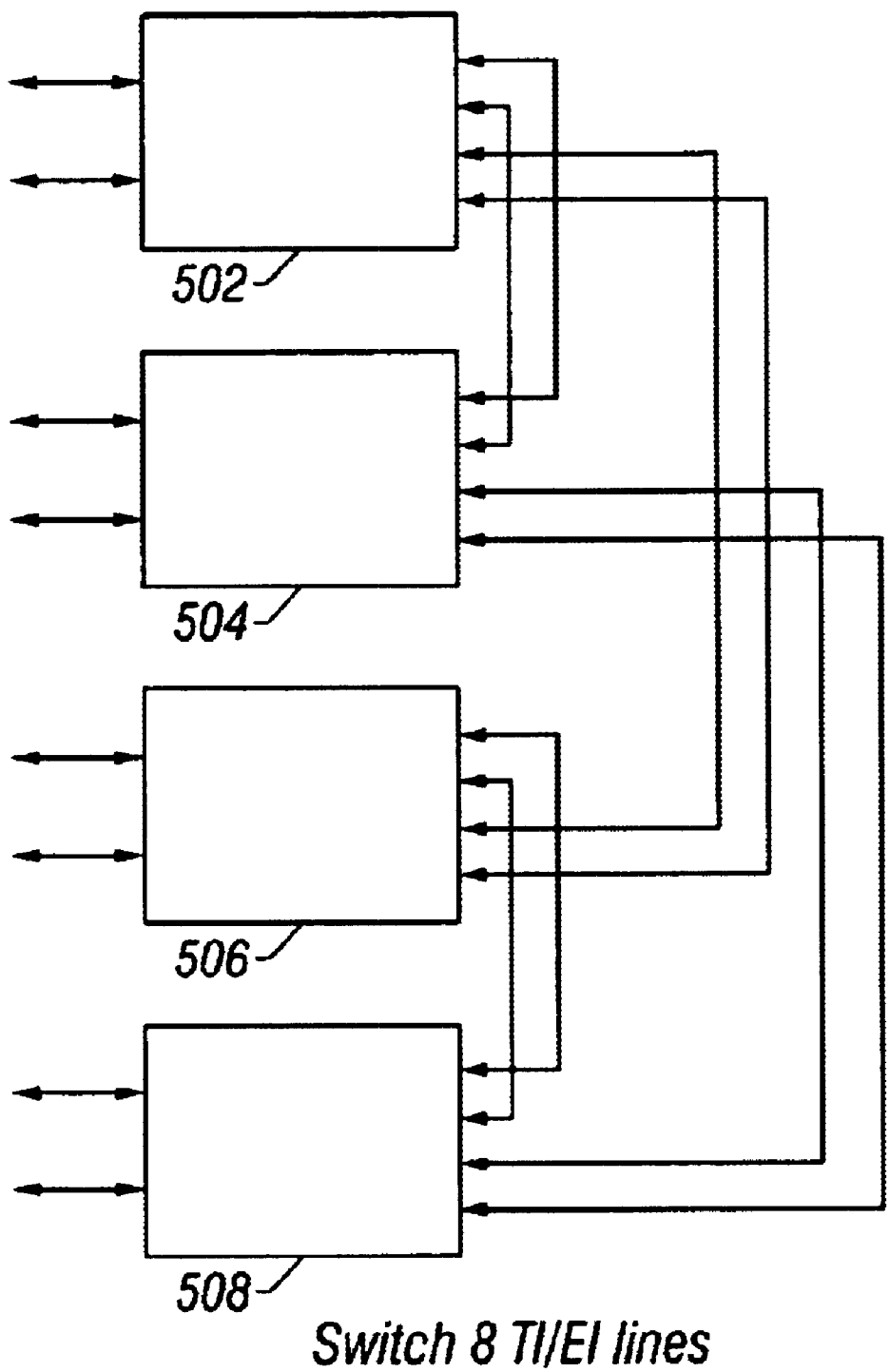
FIG. 5 is a schematic diagram of four cascaded cross connects according to an embodiment.

According to an embodiment shown in FIG. 5, more than two cross connects may be cascaded. For example, in this embodiment, four cross connects 502, 504, 506, and 508 are cascaded, each cross connect including a framer and having a structure similar to the embodiment shown in FIG. 3. The cross connects cascaded according to this embodiment may switch data transmitted on transmission lines to which they are not directly connected and may avoid blocking situations.

According to an embodiment, the cross connect and framers may be provided on the same integrated circuit (IC) chip.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a first cross connect including a first line side port and a first system side port;
   a first multiplexer to selectively transmit one of a first unswitched data stream from the first line side port and a first switched data stream from the cross connect to the first system side port;
   a second cross connect including a second line side port and a second system side port, said second system side port connected to the first system side port for bi-directional communication; and
   a second multiplexer to selectively transmit one of a second unswitched data stream from the second line side port and a second switched data stream from the cross connect to the second system side port.

2. The apparatus of claim 1, wherein the first line side port is adapted to communicate the first unswitched data stream from a first transmission line to the cross connect, and the second line side port is adapted to communicate the second unswitched data stream from a second transmission line to the cross connect.

3. The apparatus of claim 2, wherein each of said first cross connect and said second cross connect is adapted to switch either of the first unswitched data stream and the second unswitched data stream.

4. The apparatus of claim 2, wherein the transmission line is a T1 line.

5. The apparatus of claim 2, wherein the transmission line is an E1 line.

6. The apparatus of claim 1, further comprising:
   a first framer connected between the first cross connect and the first line side port to format information communicated between a first transmission line and the first cross connect; and
   a second framer connected between the second cross connect and the second line side port to format information communicated between a second transmission line and the second cross connect.

7. The apparatus of claim 6, wherein the first framer and the first cross connect are integrated in a first integrated circuit chip; and the second framer and the second cross connect are integrated in a second integrated circuit chip.

8. A cascadable cross connect device comprising:
   a first line side port to receive an unswitched data stream from a first transmission line;
   a cross connect to switch at least a portion of the unswitched data stream; and a multiplexer to pass at least a portion of the unswitched data stream to a first system side port, said port being operative to offload said at least a portion of the unswitched data stream to another device for switching and to receive a switched data stream corresponding to the offloaded portion of the unswitched data stream.

9. The device of claim 8 further comprising:

a data line operative to pass the switched data stream from the first system side port to the cross connect.

10. The device of claim 8 further comprising:

a first framer connected to the first line side port, the first framer operative to recognize a frame pattern in the unswitched data stream and format the information in the frame into time slots for switching through the cross connect.

11. The device of claim 8 further comprising:

a second system side port to transmit a switched data stream from the cross connect to a communication system.

12. A cascaded cross connect system comprising:

a first cascadable cross connect device including a first line side port to receive an unswitched data stream from a first transmission line, a first multiplexer to offload at least a portion of the unswitched data stream from the first transmission line; and a second cascadable cross connect device operative to switch said offloaded portion of the unswitched data stream from the first transmission line.

13. The system of claim 12 further comprising:

a first framer connected to the first line side port, the framer operative to recognize a frame pattern in the unswitched data stream and format the information in the frame into time slots for switching through the cross connect.

14. The system of claim 12 further comprising:

a second line side port to receive an unswitched data stream from a second transmission line; and a second multiplexer to offload at least a portion of the unswitched data stream from the second transmission line, wherein the second cascadable cross connect device is operative to switch said offloaded portion of the unswitched data stream from the second transmission line.

15. The system of claim 12 wherein the second cascadable cross connect device has substantially the same architecture as the first cascadable cross connect device.

* * * * *